United States Patent [19]
Kato et al.

[11] Patent Number: 5,184,577
[45] Date of Patent: Feb. 9, 1993

[54] RUNNING STATE CONTROL SYSTEM FOR MOTOR VEHICLE

[75] Inventors: Yuji Kato, Tokyo; Kunifumi Sawamoto, Yokosuka, both of Japan

[73] Assignee: Nissan Motor Co., Ltd., Japan

[21] Appl. No.: 591,170

[22] Filed: Oct. 1, 1990

[30] Foreign Application Priority Data

Oct. 3, 1989 [JP] Japan ............................. 1-258288

[51] Int. Cl.⁵ .............................................. F01L 1/34
[52] U.S. Cl. .................................... 123/90.15; 74/858; 180/197
[58] Field of Search ............ 123/90.15; 74/858; 180/197

[56] References Cited

U.S. PATENT DOCUMENTS 4,493,228  1/1985  Vukovich et al. ........................ 74/858
4,985,837  1/1991  Togai et al. ............................ 180/197

FOREIGN PATENT DOCUMENTS 62-31769   2/1987  Japan .
62-162753  7/1987  Japan .

Primary Examiner—Noah P. Kamen
Attorney, Agent, or Firm—Lowe, Price, LeBlanc & Becker

[57] ABSTRACT

A running state control system for a motor vehicle comprises engine output torque control means, shift detecting means, and a valve timing control system (VTC). When detecting a shifting, the shift detecting means outputs a torque cutoff command signal to the engine output torque control means so as to actuate the valve timing control system. An opening timing of intake valves is changed thereby in a direction such to decrease an engine output torque. In another aspect of the invention control is exercised over a braking torque applied to the driving wheels of the vehicle in correspondence with a traction loss or skid detected thereat.

2 Claims, 9 Drawing Sheets

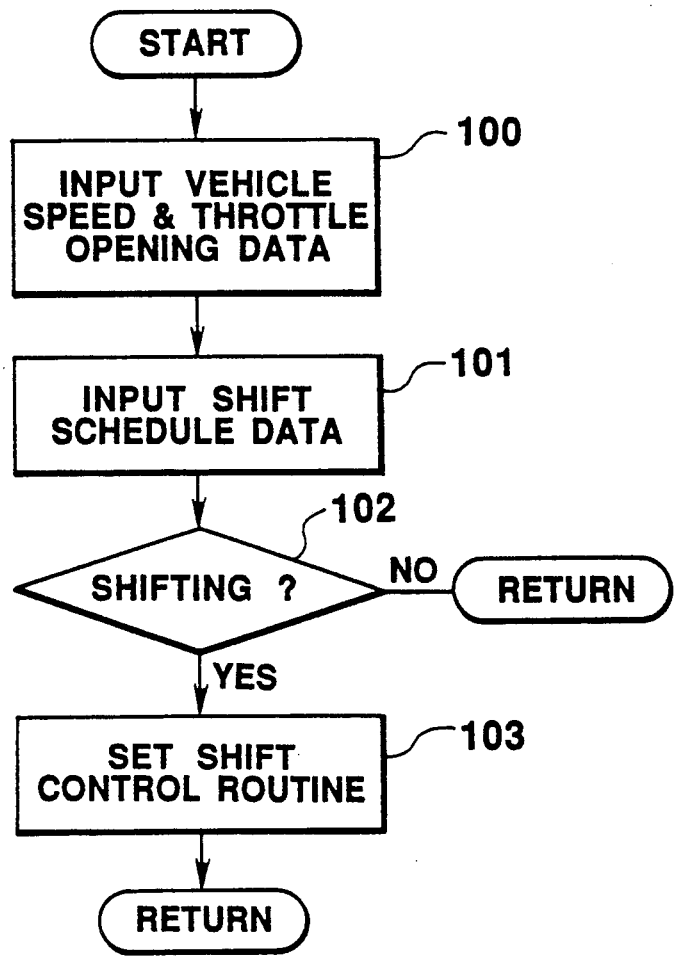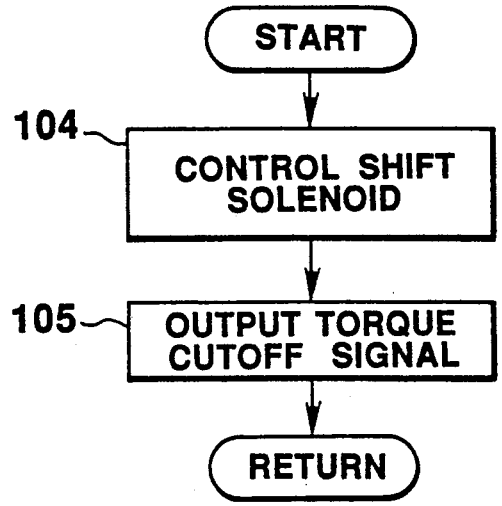

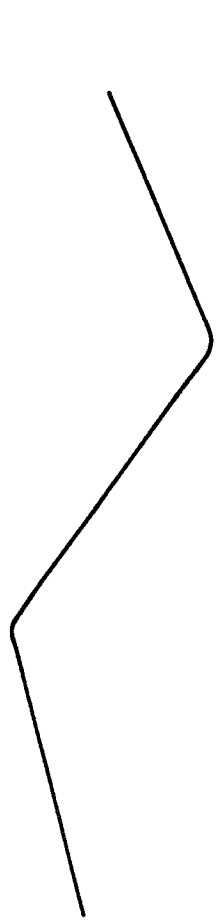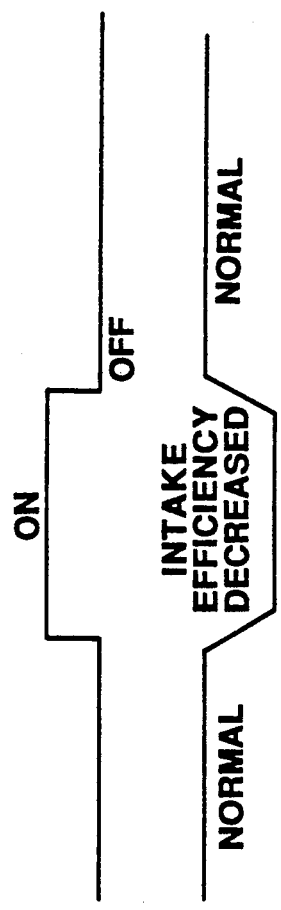
FIG.8(a) SHIFTING DETERMINED
FIG.8(b) ENGINE SPEED
FIG.8(c) TORQUE CUTOFF SIGNAL OUTPUT
FIG.8(d) VTC
FIG.8(e) ENGINE OUTPUT

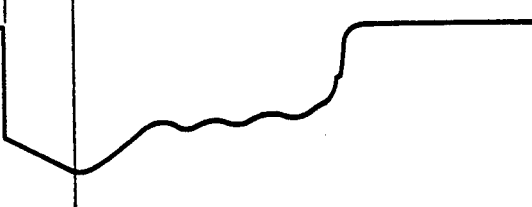

RUNNING STATE CONTROL SYSTEM FOR MOTOR VEHICLE

FIELD OF THE INVENTION

The present invention relates to a running state control system and a method for controlling operation of a motor vehicle.

BACKGROUND OF THE PRIOR ART

In general, when an engine output torque is excessive the vehicle tends to make a sudden shift, and the driving wheels may skid.

To cope with such inconveniences, some modern motor vehicles are equipped with a running state control system which decreases the engine output torque based on intake air amount control by tandem throttle valves, by ignition retardation control, by fuel supply cutoff control and the like when the engine is in an overload state. See JP-A 62-31769, for example.

With known running state control systems for a motor vehicle, however, if tandem throttle valves are used for controlling the engine output torque, the throttle chamber becomes very different in structure from the conventional one, resulting in a great increase in the manufacturing cost.

On the other hand, if ignition retardation control or fuel supply cutoff control is adopted to regulate the engine output torque, the resulting unstable engine combustion adversely affects the catalyzer arranged in the exhaust system.

SUMMARY OF THE INVENTION

It is, therefore, a principal object of the present invention to provide a running state control system for a motor vehicle which is simple in structure and assures engine output torque control without adversely affecting fuel combustion in the vehicle engine.

According to one aspect of the present invention, there is provided a running state control system for a motor vehicle, the motor vehicle having an engine, driving wheels, and intake valves, the system comprising:

means for generating a torque-cutoff signal indicative of a reduced torque demand on the engine, said means including a traction control system, said traction control system generating as said torque-cutoff signal a traction control ON indicative signal when said traction control system is operating to control traction;

means for controlling a braking torque on the driving wheels in response to said torque-cutoff signal, said braking torque controlling means comprising a brake unit; and valve timing control means for regulating an opening timing of the intake valves in a direction such as to decrease an output torque of the engine in response to said torque-cutoff signal.

According to another aspect of the present invention, there is provided a method of controlling a running state of a motor vehicle, the motor vehicle having an engine, driving wheels, and intake valves, the method comprising the steps of:

generating a torque-cutoff signal indicative of a reduced torque demand on the engine;

controlling a braking torque on the driving wheels in response to said torque-cutoff signal, said controlling step being carried out with a brake unit; and regulating an opening timing of the intake valves in a direction such as to decrease an output torque of the engine in response to said torque-cutoff signal.

BRIEF DESCRIPTION OF THE DRAWING

FIG. 4 is a flowchart showing a main routine executed by an A/T control unit shown in FIG. 1;

FIG. 5 is a view similar to FIG. 4, showing a shift control routine;

FIG. 8 is a time chart shown in connection with the first preferred embodiment;

FIG. 12 is a view similar to FIG. 8, shown in connection with the second preferred embodiment.

DETAILED DESCRIPTION OF THE PREFERRED EMBODIMENTS

Referring to the accompanying drawings, preferred embodiments of a running state control system for a motor vehicle according to the present invention will now be described.

Figure 1:
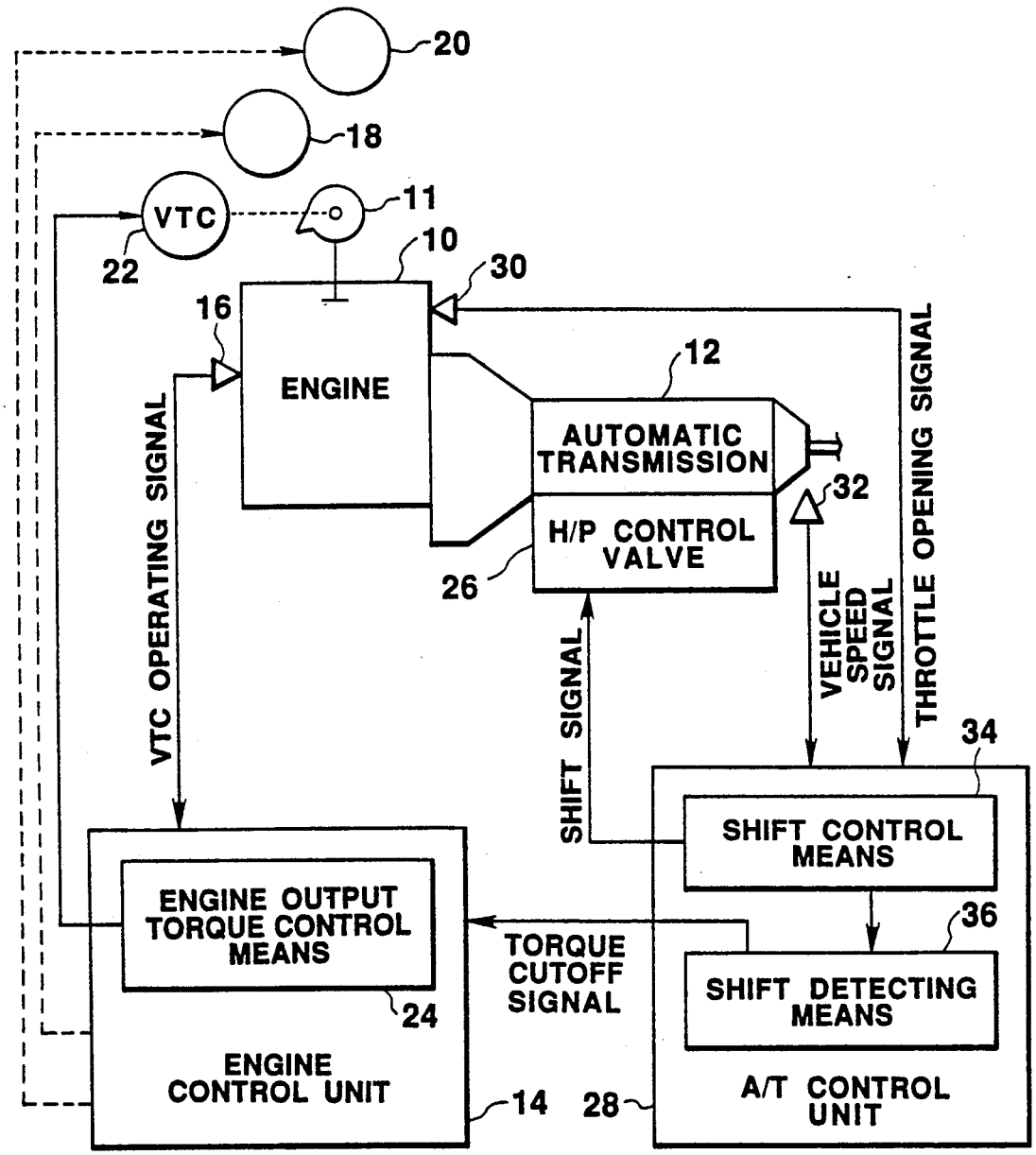
FIG. 1 is a block diagram illustrating a first preferred embodiment of a running state control system for a motor vehicle according to a preferred embodiment of the present invention.

Referring to FIG. 1, there is shown a first preferred embodiment of a running state control system for a motor vehicle according to the present invention. The system includes an engine 10, an automatic transmission 12, and a valve timing control system 22. The engine 10 is provided with an engine control unit 14 which receives an inflow air amount signal from an airflow meter 16 and provides control signals by which an ignition actuator 18 and a fuel injector 20 are controlled.

Engine 10 is also provided with a valve timing control system 22 which controls an opening timing of intake valves 11 and receives a control signal from engine output torque control means 24 incorporated into the engine control unit 14.

The valve timing control system 22, which is abbreviated to VTC, is disclosed in, for example, JP-A 62-162753.

On the other hand, to the automatic transmission 12 is mounted a hydraulic pressure control valve 26 for performing a shift control which receives a shift control signal from automatic transmission (A/T) control unit 28.

The shift control signal outputted by the A/T control unit 28 is checked against signals from a throttle sensor 30 for detecting a throttle opening degree of the engine 10 and a vehicle speed sensor 32 for detecting an output rotational speed of the automatic transmission 12, respectively, thus determining a shift point for an upshift and a downshift.

Figure 2:
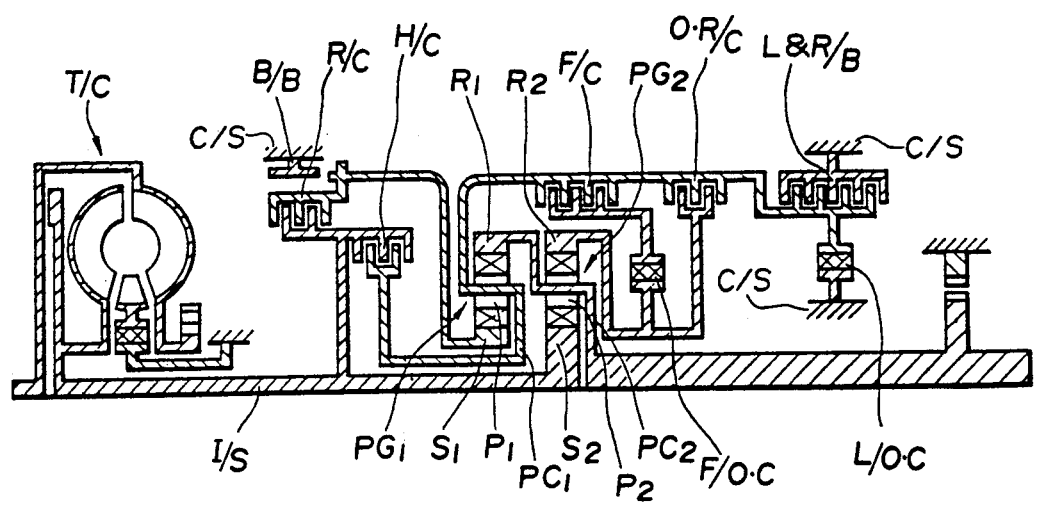
FIG. 2 is a schematic diagram illustrating a gear train of an automatic transmission shown in FIG. 1.

Referring to FIG. 2, a gear train of the automatic transmission 12 includes a first planetary gear set $PG_1$, and a second planetary gear set $PG_2$.

The first and second planetary gear sets $PG_1$ and $PG_2$ are constructed as simple planetary gear sets, respectively. The first planetary gear set $PG_1$ includes a first sen gear $S_1$, first pinion gears $P_1$, a ring gear $R_1$, and a first pinion carrier $PC_1$. The second planetary gear set $PG_2$ includes a second sun gear $S_2$, second pinion gears $P_2$, a second ring gear $R_2$, and a second pinion carrier $PC_2$.

The gear train also includes a reverse clutch (R/C) which connects an input shaft (I/S) with a first sun gear $S_1$, a high clutch (H/C) which connects the input shaft (I/S) with the first pinion carrier ($PC_1$), a forward clutch (F/C) which connects the first pinion carrier ($PC_1$) with the second ring gear $R_2$, a bank brake (B/B) which secures the first sun gear $S_1$ to a casing (C/S), and a low and reverse brake (L&R/B) which secures the first pinion carrier $PC_1$ to the casing (C/S).

A forward one-way clutch (F/O·C) is operatively disposed between the forward clutch (F/C) and the second ring gear $R_2$. A low one-way clutch (L/O·C) is operatively disposed between the first pinion carrier $PC_1$ and the casing (C/S) Additionally, an overrunning clutch (O·R/C) is operatively disposed between the first pinion carrier $PC_1$ and the second ring gear $R_2$, and is disposed to be in parallel with the forward one-way clutch F/O·C.

Torque from the engine 10 is inputted via a torque converted T/C to input shaft (I/S).

The automatic transmission 12 includes a plurality of friction elements such as (R/C), (H/C), (F/C), (B/B), and (L&R/B), each being engaged and disengaged by a line pressure or a working pressure provided from the hydraulic pressure control valve 26, thus obtaining one of gear positions as shown in TABLE 1:

TABLE 1

| GEAR POSITIONS | | FRICTION ELEMENTS | | | | |
|---|---|---|---|---|---|---|
| | | R/C | H/C | F/C | B/B | L&R/B |
| REVERSE | | O | | | | O |
| FORWARD | 1st | | | O | | |
| | 2nd | | | O | O | |
| | 3rd | | O | O | | |
| | 4th | | O | O | O | |

It is to be noted that, in TABLE 1, a cell with a circle indicates that the corresponding friction element is engaged, and a cell without a circle indicates the corresponding friction element is disengaged.

The forward one-way clutch (F/O·C) is released when the second ring gear $R_2$ rotates in the normal direction with respect to the first pinion carrier ($PC_1$, and locked when the ring gear $R_2$ rotates in the opposite direction with respect to the pinion carrier ($PC_1$), whereas the low one-way clutch (L/O·C) is released when the first pinion carrier ($PC_1$) rotates in the normal direction, and locked when the pinion carrier ($PC_1$) rotates in the opposite direction.

If the overrunning clutch (O·R/C), not shown in TABLE 1, is engaged in a low gear position at less than the 3rd speed and at an accelerator opening degree less than 1/16, the forward one-way clutch (F/O·C) becomes inoperative and an engine brake is actuated.

Figure 3:
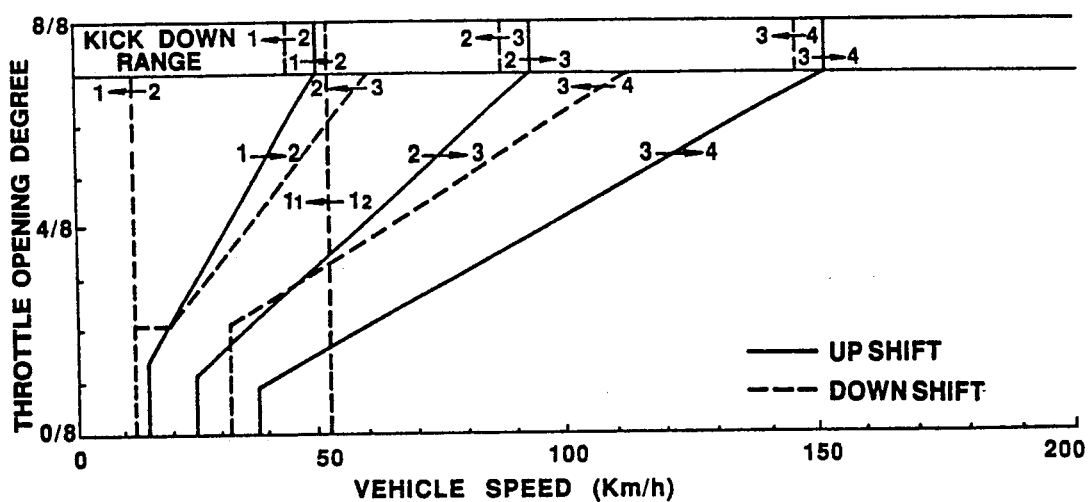
FIG. 3 is a graphical representation illustrating a shift schedule of the automatic transmission.

Referring to FIG. 3, the line pressure provided from the hydraulic pressure control valve 26 for engaging and disengaging the plurality of friction elements is controlled, in accordance with a shift schedule as shown in FIG. 3, by a shift signal provided from shift control means 34 incorporated into the A/T control unit 28.

It is to be noted that, in the shift schedule as shown in FIG. 3, the vehicle speed is plotted along the horizontal axis, and the throttle opening degree is plotted along the vertical axis. These are used for determining the shifting of gears.

As described above in connection with TABLE 1, the automatic transmission 12 changes an appropriate combination of the friction elements to be engaged upon shifting. It is desirable, during shifting, that the engine torque be reduced so as to minimize shock due to engagement of the friction elements. If shifting takes place where the level of engine torque was high before this shifting, i.e., the engine torque level was excessive, an engine overload may be caused.

In the preferred embodiment, the A/T control unit 28 includes shift detecting means 36 for detecting a shift point determined by the shift control means 34, which functions as an engine output state detecting means.

Specifically, when the shift detecting means 36 detects the shifting, automatic transmission 12 begins to change the combination of the friction elements to be engaged, and an overload state of the engine 10 is determined at this change point.

Additionally, when detecting the shifting, the shift detecting means 36 outputs an operating signal or a torque cutoff command signal to the engine output torque control means 24 of the engine control unit 14 so as to actuate the valve timing control system 22.

Specifically, when the valve timing control system 22 is actuated, an opening timing of the intake valves 11 is changed in a direction such as to increase the intake flow resistance, i.e., in a direction such as to decrease the output torque of the engine 10.

Referring to FIGS. 4–7, the operation of the first preferred embodiment will now be described.

In FIG. 4 there is shown a main routine which is executed by the A/T control unit 28.

At step 100, vehicle speed data and throttle opening degree data are inputted. At a subsequent step 101, shift schedule data as shown in FIG. 3 are inputted.

Subsequently, at step 102, it is determined whether or not gear shifting is required, by retrieving the shift schedule based on the vehicle speed and throttle opening degree inputted. If the answer at the step 102 is NO, the routine comes to RETURN. If the answer is YES, the routine proceeds to step 103 where a shift control routine, as shown in FIG. 5, is set. Then, the routine comes to RETURN.

Referring to FIG. 5, there is shown the shift control routine as described above. At step 104, a shift solenoid is controlled. This shift solenoid is arranged with respect to the hydraulic pressure control valve 26 so as to change an engagement pressure provided to the friction elements. At a subsequent step 105, the torque cutoff command signal is outputted, and the routine then comes to RETURN.

Figure 6:
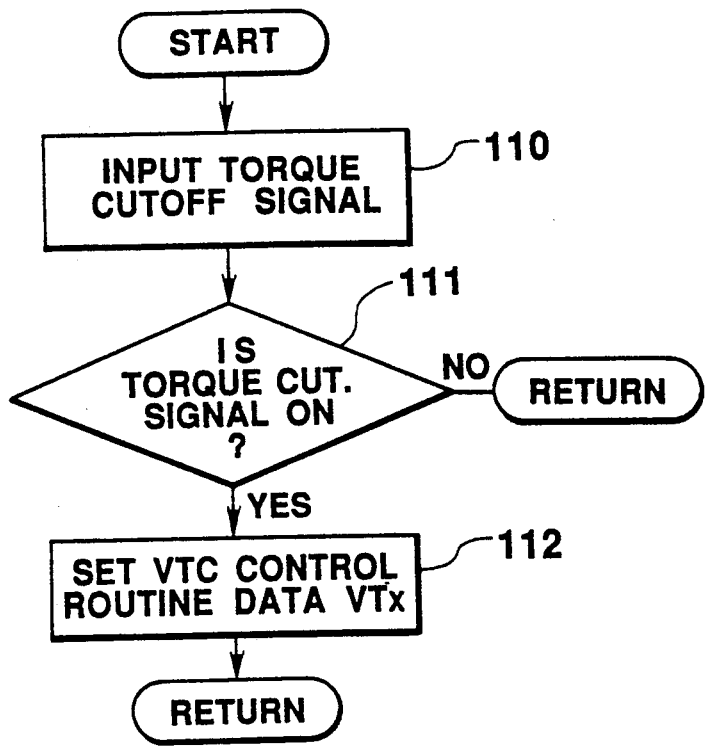
FIG. 6 is a view similar to FIG. 5, showing a main routine executed by an engine control unit shown in FIG. 1.

Referring to FIG. 6, there is shown a main routine which is executed by the engine control unit 14.

At step 110, the torque cutoff command signal, which is outputted at the step 105, is inputted. At a subsequent step 111, it is determined whether the torque cutoff command signal is in the ON state or not, i.e., whether or not it is outputted. If the answer at step 111 is NO, the routine comes to RETURN, whereas if the answer is YES, the routine proceeds to a step 112 where a VTC control routine data $VT_x$ is set. The routing then comes to RETURN.

Figure 7:
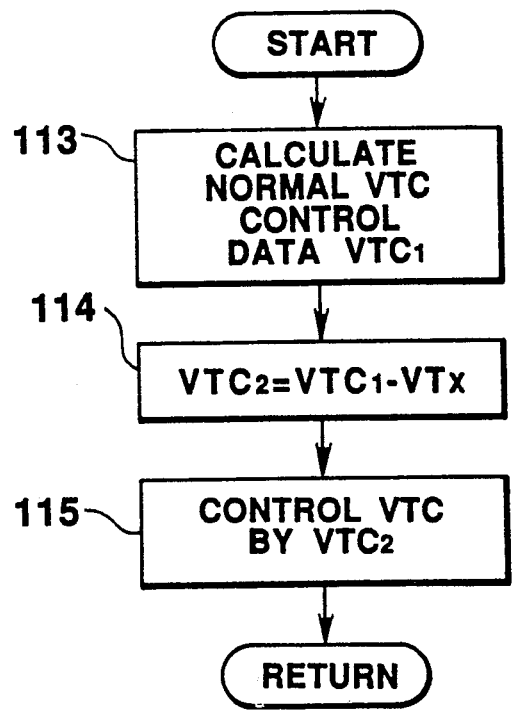
FIG. 7 is a view similar to FIG. 6, showing a valve timing control system (VTC) control routine.

Referring to FIG. 7, there is shown a VTC control routine.

At a step 113, a normal VTC control data ($VTC_1$) is calculated. At step 114, an actual control data ($VTC_2$) is obtained by subtracting ($VT_x$) from ($VTC_1$). At a subsequent step 115, a VTC control is performed on the data ($VTC_2$). The routine then comes to RETURN.

Referring to FIG. 8, with the control as described above, if occurrence of shifting (upshifting, in this embodiment) is determined as indicated by a characteristic curve (a), the automatic transmission 12 changes the combination of the friction elements as shown in TABLE 1. While changing the aforementioned combination, the automatic transmission 12 temporarily falls into a neutral of inertia phase, so that the engine rotational speed is decreased in accordance with the inertia phase as indicated by a characteristic curve (b).

The shift detecting means 36 then outputs to the engine output torque control means 24 the torque cutoff command signal, as indicated by a characteristic curve (c), thus actuating the valve timing control system 22 as indicated by a characteristic curve (d) so as to decrease the intake efficiency.

With the decrease in intake efficiency, the engine output torque is also decreased, resulting in considerably reduced shock due to engagement of the friction elements after a lapse of the inertia phase.

In this embodiment, since the reduction in engine output torque is obtained by decrease in intake efficiency by controlling the opening timing of the intake valves via the valve timing control system 22, the valve timing control system 22 which is conventionally arranged for a combustion control upon idling is usable as it is. This results in a simplified structure of the running state control system.

Further, since the torque cutoff is obtained not by performing the ignition retardation or the fuel supply cutoff, but by reducing the intake efficiency, i.e., the intake air amount itself, stable combustion in the engine 10 is always assured.

Thus, the generation of unburnt gas and/or deterioration in fuel consumption can be effectively prevented.

Figure 9:
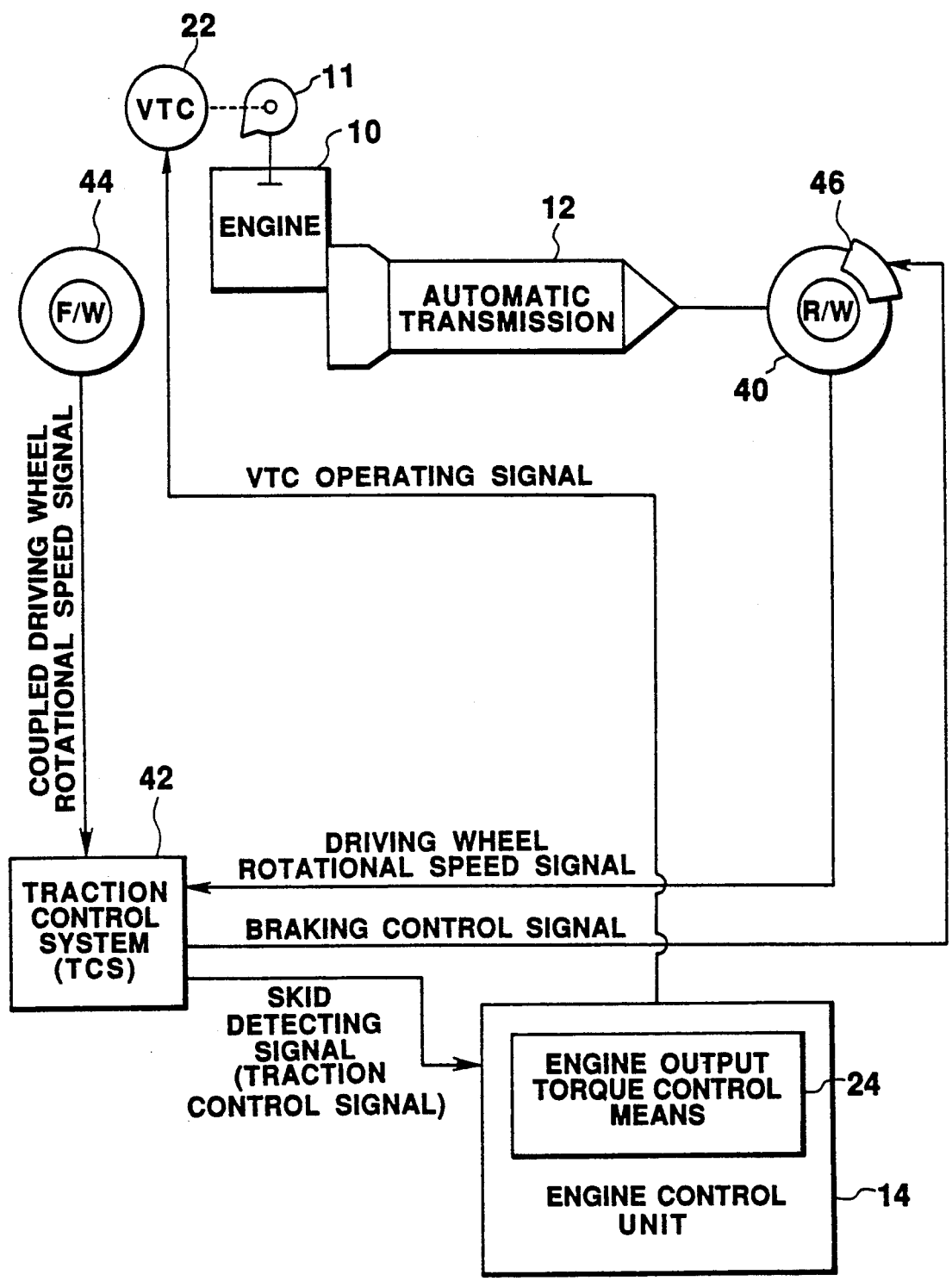
FIG. 9 is a view similar to FIG. 1, illustrating a second preferred embodiment of a running state control system according to the present invention.

Referring to FIG. 9, there is shown a second preferred embodiment of a running state control system for a motor vehicle according to the present invention. It is to be noted that, in FIG. 9, the same reference numerals are given to the same elements as in FIG. 1, hence a repeated description will be omitted.

The running state control system per FIG. 9 is designed to effectively prevent skidding the driving wheels 40 (rear wheels, in this embodiment) rotated by traction provided rom an automatic transmission 12 when shifting occurs. The running state control system includes an engine output state detecting means or a traction control system 42 (TCS), by which the skid ratio of the driving wheels 40 or the overload state of an engine 10, respectively, is detected.

The traction control system 42 is suitable for a vehicle having all-wheel drive, and inputs rotational speeds of the driving wheels 40 and coupled driving wheels 44 (front wheels, in this embodiment), and calculates the skid ratio from the difference between the two. This system 42 outputs a skid detecting signal to engine output torque control means 24 of an engine control unit 14, and a brake unit 46 which is arranged to the driving wheels 40.

Figure 10:
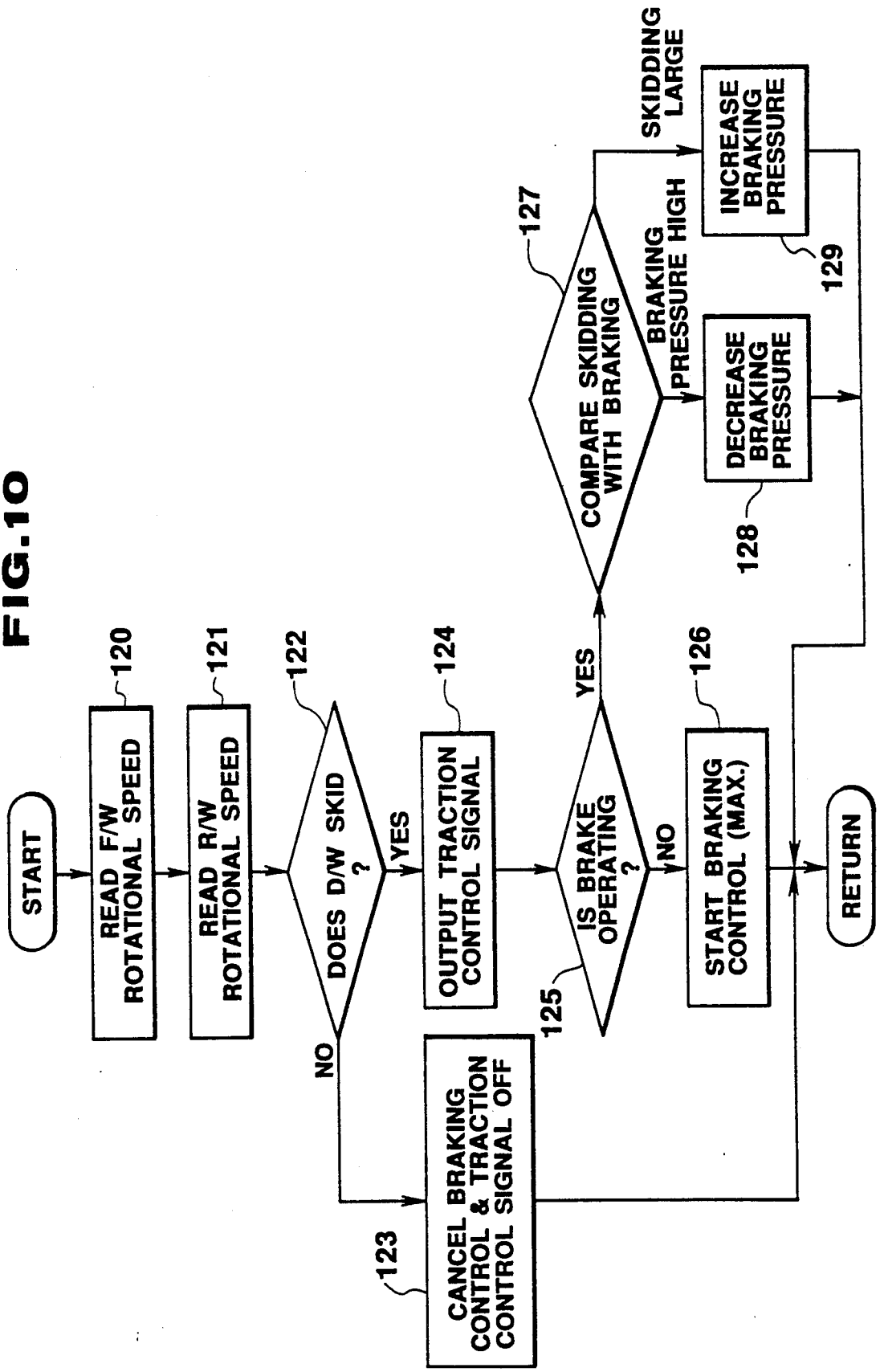
FIG. 10 is a view similar to FIG. 7, showing a routine executed by a TCS shown in FIG. 9.
Figure 11:
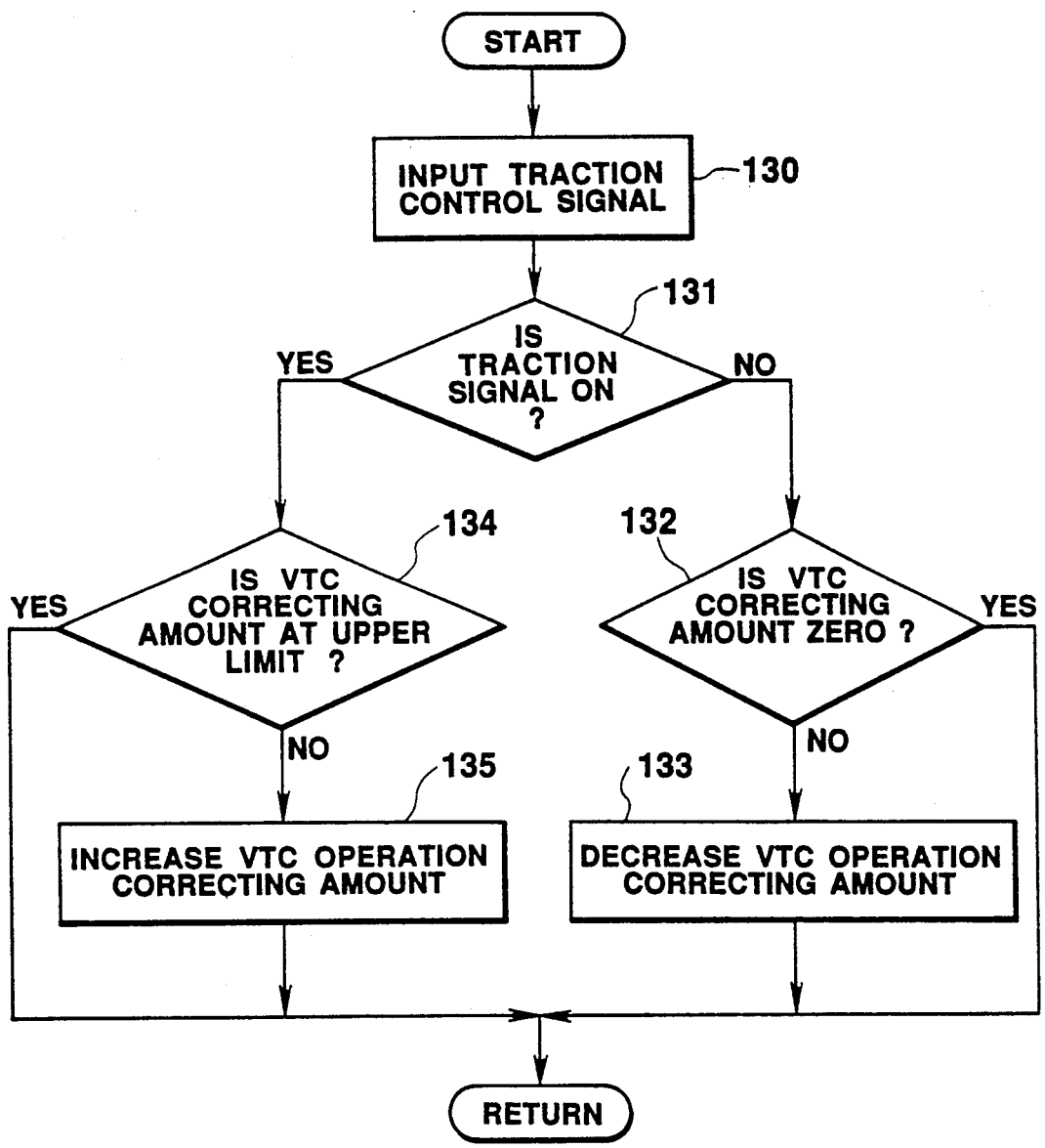
FIG. 11 is a view similar to FIG. 10, showing a routine executed by an engine control unit shown in FIG. 9.

Referring to FIGS. 10 and 11, the operation of the second preferred embodiment will be described.

In FIG. 10 there is shown a routine which is executed by the traction control system 42.

At step 120 the rotational speed of the coupled driving wheels 44 is read, and at step 121 the rotational speed of the driving wheels 40 is read. At a subsequent step 122, it is determined from the difference between the two rotational speeds whether a skid of the driving wheels 40 occurs or not.

If the answer at the step 122 is NO, the routine proceeds to a step 123 where a braking control of the brake unit 46 is cancelled, and a traction control signal is turned off. Then, the routine comes to RETURN. The traction control signal is a signal outputted from the traction control system 42 upon occurrence of the skid of the driving wheels 40.

On the other hand, if the answer at the step 122 is YES, the control proceeds to a step 124 where the traction control signal is outputted to the engine control unit 14 and the routine then proceeds to a step 125.

At step 125, it is determined whether the brake unit 46 is in operation or not. If the answer is NO, the routine proceeds to a step 126 where the braking control of the brake unit 46 begins to perform at the maximum value. The, the routine comes to RETURN. On the other hand, if the answer at the step 125 is YES, the routine proceeds to step 127 where a skid amount of the driving wheels 40 is compared with a braking amount of the brake unit 46.

If it is determined at step 127 that the braking amount is larger, the routine proceeds to step 128 where the braking pressure is decreased so as to reduce the braking amount. Then, the routine comes to RETURN. On the other hand, if it is determined that the skid amount is larger, the routine proceeds to step 129 where the braking pressure is increased so as to augment the braking amount. Then, the routine comes to RETURN.

Referring to FIG. 11, there is shown a routine which is executed by the engine control unit 14.

At step 130, the traction control signal is inputted. At a subsequent step 131, it is determined whether the traction control signal is ON or not.

If the answer at the step 131 is NO, the routine proceeds to step 132 where it is determined whether a VTC operation correcting amount is zero or not. If the answer at the step 132 is NO, the routine proceeds to step 133 where a VTC operation correcting amount is decreased, then, the routine comes to RETURN.

On the hand, if the answer at step 131 is YES, the routine proceeds to step 134 where it is determined whether the TC operation correcting amount is at the upper limit or not. If the answer at step 134 is NO, the routine proceeds to step 135 where the VTC operation correcting amount is increased, i.e., the intake valves are regulated in a direction such as to decrease the intake efficiency, then, the routine comes to RETURN.

Referring to FIG. 12, in this embodiment, if the skid of the driving wheels 40 as indicated by characteristic curve (a) is detected by the traction control system 42, the braking force as indicated by characteristic curve (c) is controlled in accordance with a variation of the skid amount as indicated by characteristic curve (b).

With the detection o the skid as indicated by the characteristic curve (a), the intake efficiency is controlled in a decreased direction by the operation of the VTC as indicated by characteristic curve (d). And, the engine output torque is decreased therewith as indicated by characteristic curve (e) (−20 through 30%).

In this embodiment, since the traction of the driving wheels 40 is decreased by the engine output control as described above, and the braking control as indicated by a characteristic curve (f), the skid of the driving wheels 40 can be effectively prevented.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A running state control system for a motor vehicle, the motor vehicle having an engine, driving wheels and intake valves, the system comprising:
   means for generating a torque-cutoff signal indicative of a reduced torque demand on the engine, said means including a traction control system, said traction control system generating as said torque-cutoff signal a traction control ON indicative signal when said traction control system is operating to control traction;
   means for controlling a braking torque on the driving wheels in response to said torque-cutoff signal said braking torque controlling means comprising a brake unit; and
   valve timing control means or regulating an opening timeing of the intake valves in a direction such as to decrease an output torque of the engine in response to said torque-cutoff signal.

2. A method of controlling a running state of a motor vehicle, the motor vehicle having an engine, driving wheels and intake valves, the method comprising the steps of:
   generating a torque-cutoff signal indicative of a reduced torque demand on the engine;
   controlling a braking torque on the driving wheels in response to said torque-cutoff signal, said controlling step being carried out with a brake unit; and
   regulating an opening timing of the intake valves in a direction such as to decrease an output torque of the engine in response to said torque cutoff signal.

* * * * *